E. ROTH AND J. STEINER.
PLANSIFTER.
APPLICATION FILED APR. 16, 1920.

1,359,840.

Patented Nov. 23, 1920.
2 SHEETS—SHEET 1.

Inventors
Ernst Roth,
Jakob Steiner,
By Henry ⟨illegible⟩
Atty

UNITED STATES PATENT OFFICE.

ERNST ROTH, OF NIEDERUZWIL, AND JAKOB STEINER, OF WIL, ST. GALLEN, SWITZERLAND, ASSIGNORS TO THE FIRM BUHLER BROTHERS, OF UZWIL, SWITZERLAND.

PLANSIFTER.

1,359,840. Specification of Letters Patent. Patented Nov. 23, 1920.

Application filed April 16, 1920. Serial No. 374,407.

*To all whom it may concern:*

Be it known that we, ERNST ROTH, a citizen of the Republic of Switzerland, residing at Niederuzwil, Switzerland, and JAKOB STEINER, a citizen of the Republic of Switzerland, residing at Wil, St. Gallen, Switzerland, have invented new and useful Improvements in Plansifters; and we do hereby declare the following to be a clear, full, and exact description of the invention, such as will enable others skilled in the art to which it appertains to make and use the same, reference being had to the accompanying drawings, and to letters or figures of reference marked thereon, which form a part of this specification.

This invention relates to improvements in a so-called freely oscillating plansifter of the type in which the sieve box and the balancing weight thereof causing the rotary movement are each suspended separately, or in which the sieve box is supported in an appropriate manner and only the balancing weight is suspended and in which furthermore, in a known manner, the position of the balancing weight does not change appreciably in relation to the center of gravity of the sieve box either when the sifter is at work or when it is at rest. In known constructions of this type of plansifters the pendulum shaft on which the balancing weight is suspended is connected in an articulated manner to the latter approximately in the vertical gravity axis of the balancing weight. Such an arrangement is the object of the Patent No. 1210989 dated 2nd January 1917.

Such arrangements have presented the draw-back that the wear and tear at the point of articulation is very considerable and may even lead to corrosion by which circumstances smooth running of the sifter is endangered. The worn parts hinder the correct movements of the whole plansifter, so that it cannot adjust itself and further the shaft does no longer run true on account of the clearance in the articulation.

The object of the present invention is to provide a connection between the pendulum shaft and the balancing weight by which the aforementioned disadvantages are overcome.

To this end a flexible connection is provided between the pendulum shaft and the balancing weight which insures the transmission of the turning moment, which carries the balancing weight and owing to the flexibility of the connecting members allows of adjusting of the various parts under all working conditions.

The accompanying drawings illustrate by way of example several modes of carrying the invention into effect. In these drawings.

Figure 1:
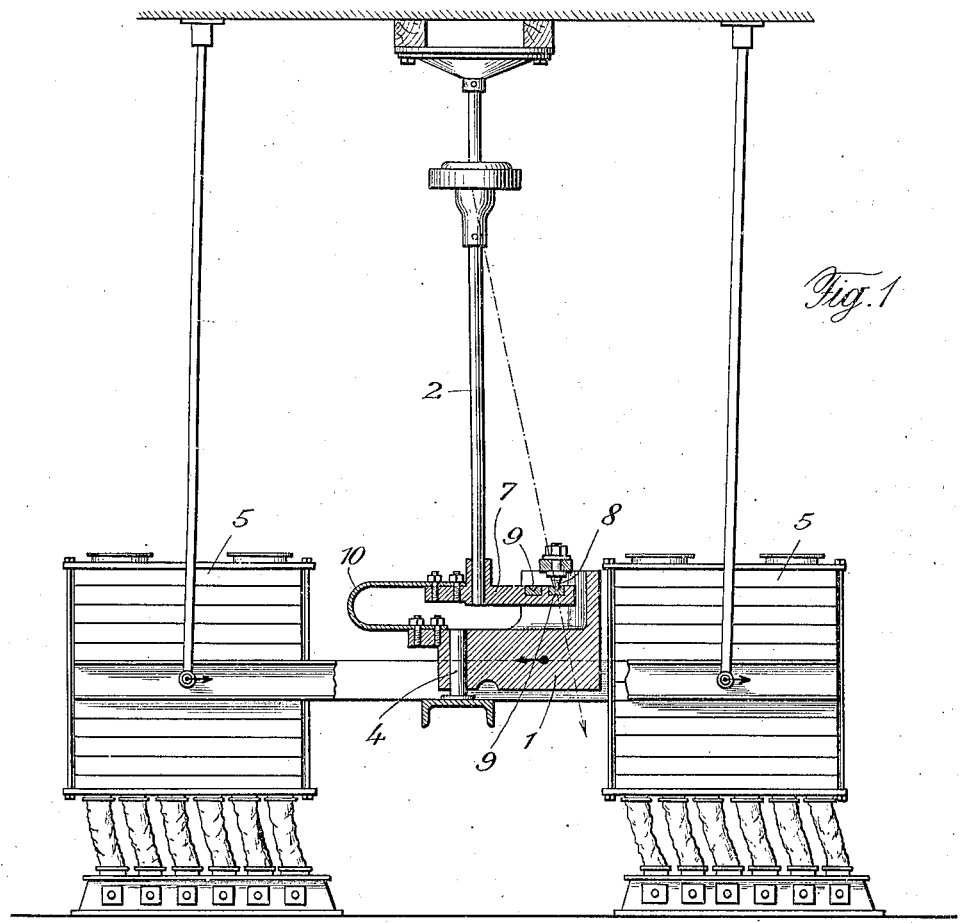
Figure 1 is a front view of a plansifter in which the connection according to the invention between the pendulum shaft and the balancing weight is shown in section.
Figure 2:
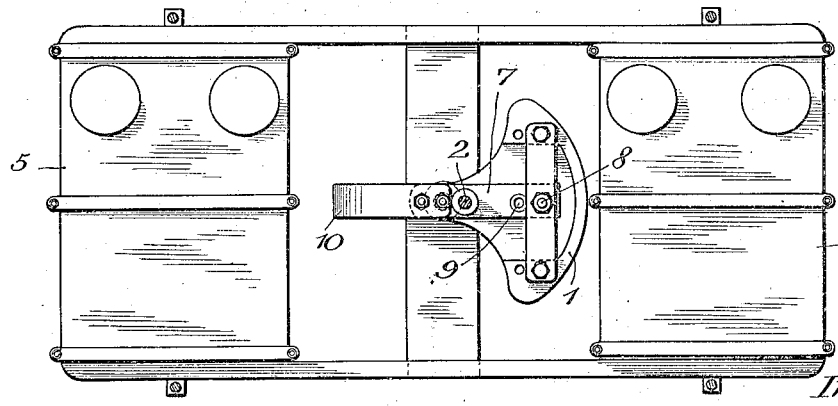
Fig. 2 is a plan of Fig. 1.
Figure 5:
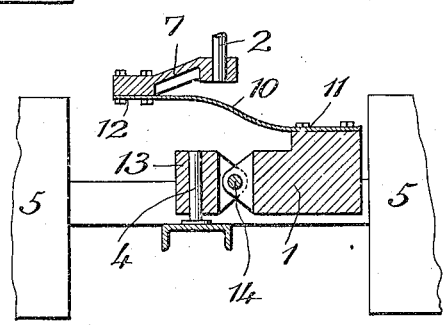

Referring first to Figs. 1 and 2, 5 denotes the suspended sieve box and 4 the driving gudgeon arranged between the two halves of the sieve box and approximately half the height thereof, the gudgeon 4 entering into a bore of the balancing weight 1. In the exemplification shown the flexible connection between the pendulum shaft and the balancing weight consists of an articulated joint and a spring connection. To the arm 7 fixed to the lower end of the separately suspended pendulum shaft 2 the balancing weight is suspended in such a way that it can adjust itself during its turning movement. To this end the balancing weight 1 rests by means of a hardened steel point 8, secured to the weight, in a suitably arranged seat 9 of the arm 7. Several such seats may be arranged on arm 7, two seats are shown in Fig. 1. Furthermore a U-shaped plate spring 10 is provided, the one end of which is fixed to the arm 7 of the pendulum shaft 2 and the other end is secured to the balancing weight 1. This spring serves to transmit the rotary movement of the driving shaft 2 to the balancing weight 1 and it does not hinder in any way the movement of the sifter 5. The balancing weight does not change its position appreciably in relation to the center of gravity of the sieve box 5 when working, as the balancing weight is arranged suchwise in relation to the driving gudgeon 4, that the centrifugal forces produced when it is at work cannot cause it to alter appreciably its position in relation to the center of gravity of the sieve box. The friction in the fulcrum-bearing of the suspended balancing weight 1 is a negligible quantity and any wear of the chilled point 8 is nearly excluded. Furthermore when the sifter is working under abnormal conditions a tension is produced in the spring 10 resulting from the variation of the relative positions of pendulum shaft 2 and balancing weight 1, which tension tends to bring the sifter 5 back into its normal position.

Figure 3:
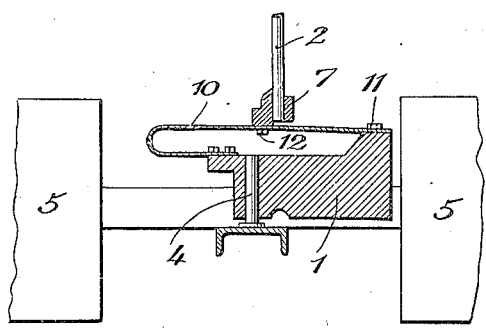
Fig. 3 shows a modified arrangement of the object of the invention in a vertical section.

In the exemplification of the invention shown in Fig. 3 the flexible connection between pendulum shaft and balancing weight consists of a U-shaped spring 10, the one shank of which is lengthened and secured to the balancing weight at 11, and fixed to the arm 7 on the fulcrum shaft 2 at 12. The transmission of the driving moment from pendulum shaft to balancing weight, and the suspension of the weight is effected by this spring 10 which moreover allows a variation of the relative positions of the pendulum shaft 2 and balancing weight 1 and counteracts that variation in a resilient manner.

Figure 4:
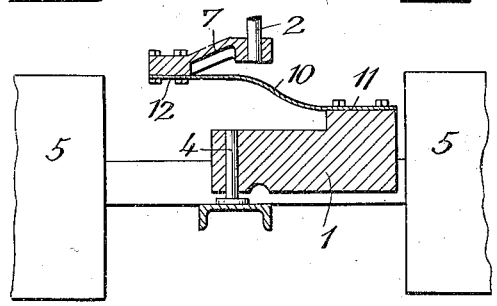
Figs. 4 and 5 show further modifications.

In the modification illustrated in Fig. 4 in place of the U-shaped spring 10 of the exemplification shown in Fig. 3, a plate spring 10 is used the ends of which are connected at 12 to an arm 7 secured to the lower end of the pendulum shaft 2 and at 11 to the balancing weight. The functions of this plate spring are the same as that described above for the U-shaped spring.

The constructional example shown in Fig. 5 differs from that shown in Fig. 4 inasmuch as for the purpose of attaining a greater flexibility in the connection between pendulum shaft and balancing weight, the latter is not adapted to take up the driving pin as in the above mentioned exemplifications of the invention, but a separate part or sleeve 13 is provided to that end. The connection of part 13 to the balancing weight is effected by eyes and a horizontally arranged pin 14 around which the weight may swing when its position relatively to sleeve 13 is altered.

All the exemplifications shown and described hereinbefore are based on the same principle of providing a flexible connection between pendulum shaft and balancing weight to which the aforementioned advantages are inherent.

We claim:

1. In a freely oscillating plansifter, the combination of a sieve box, a pendulum member, a balancing weight, and a flexible connection between pendulum member and balancing weight, which connection transmits the rotary movement from the pendulum member to the balancing weight, by which connection the latter is suspended and which allows of an adjustment of the moving parts under all working conditions.

2. In a freely oscillating plansifter, the combination of a sieve box, a pendulum member, a balancing weight, and a flexible connection between pendulum member and balancing weight consisting of a resilient member connected to the pendulum member and to the balancing weight and of a suspension device for suspending the balancing weight to the pendulum member which parts of said connection allow of an adjustment of the moving parts under all working conditions.

3. In a freely oscillating plansifter, the combination of a sieve box, a pendulum member, a balancing weight, and a flexible connection between pendulum member and balancing weight consisting of a U-shaped spring the shorter shank of which is secured to the balancing weight and the longer shank of which is fixed to the balancing weight and to the pendulum member and which spring serves to transmit the rotary movement of the pendulum member to the balancing weight, further to carry the latter and to allow of an adjustment of the moving parts under all working conditions.

4. In a freely oscillating plansifter, the combination of a sieve box, a pendulum member, a balancing weight, and a flexible connection between pendulum member and balancing weight consisting of a spring member one end of which is secured to the pendulum member and the other end to the balancing weight.

5. In a freely oscillating plansifter, the combination of a sieve box, a pendulum member, a balancing weight, and a flexible connection between pendulum member and balancing weight, consisting of a plate spring the ends of which are secured to the pendulum member and the balancing weight respectively and of an articulated joint between the balancing weight and its fulcrum.

In testimony that we claim the foregoing as our invention, we have signed our names.

ERNST ROTH.
JAKOB STEINER.